(12) United States Patent
Guo

(10) Patent No.: US 11,550,731 B2
(45) Date of Patent: Jan. 10, 2023

(54) PROCESSING METHOD AND APPARATUS FOR TRANSLATION LOOKASIDE BUFFER FLUSH INSTRUCTION

(71) Applicant: Alibaba Group Holding Limited, Grand Cayman (KY)

(72) Inventor: Ren Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 140 days.

(21) Appl. No.: 17/014,752

(22) Filed: Sep. 8, 2020

(65) Prior Publication Data

US 2021/0073144 A1  Mar. 11, 2021

(30) Foreign Application Priority Data

Sep. 9, 2019 (CN) .......................... 201910848332.8

(51) Int. Cl.
*G06F 12/1045* (2016.01)
*G06F 12/0891* (2016.01)
*G06F 9/455* (2018.01)

(52) U.S. Cl.
CPC ...... *G06F 12/1045* (2013.01); *G06F 9/45558* (2013.01); *G06F 12/0891* (2013.01); *G06F 2009/45583* (2013.01); *G06F 2212/1016* (2013.01); *G06F 2212/68* (2013.01)

(58) Field of Classification Search
CPC ............ G06F 12/1045; G06F 9/45558; G06F 12/0891; G06F 2009/45583; G06F 2212/1016; G06F 2212/68; G06F 12/0882; G06F 12/0833; G06F 12/0853
See application file for complete search history.

(56) References Cited

U.S. PATENT DOCUMENTS

| 2011/0238947 A1* | 9/2011 | Nishiguchi ......... G06F 12/1036 711/207 |
| 2014/0195742 A1 | 7/2014 | Kim et al. |
| 2015/0242319 A1* | 8/2015 | Evans ................ G06F 12/0833 711/207 |

(Continued)

*Primary Examiner* — Sean D Rossiter

(57) ABSTRACT

The present invention discloses an instruction processing apparatus, including: a first register adapted to store address information; a second register adapted to store address space identification information; a decoder adapted to receive and decode a translation lookaside buffer flush instruction, where the translation lookaside buffer flush instruction indicates that the first register serves as a first operand, and the second register serves as a second operand; and an execution unit coupled to the first register, the second register, and the decoder and executing the decoded translation lookaside buffer flush instruction, so as to acquire address information from the first register, to acquire address space identification information from the second register, and to broadcast the acquired address, information and address space identification information on a bus coupled to the instruction processing apparatus, so that another processing unit coupled to the bus performs purging on a translation lookaside buffer, corresponding to the address information, in an address space indicated by the address space identification information. The present invention also discloses a corresponding instruction processing method, a computing system, and a system-on-chip.

19 Claims, 9 Drawing Sheets

(56) References Cited

U.S. PATENT DOCUMENTS

| | | | |
|---|---|---|---|
| 2015/0370590 A1* | 12/2015 | Tuch | G06F 9/4843 |
| | | | 718/1 |
| 2016/0140047 A1 | 5/2016 | Mukherjee et al. | |
| 2018/0196759 A1 | 7/2018 | Bennett et al. | |
| 2019/0155630 A1 | 5/2019 | Zhu et al. | |
| 2020/0167292 A1* | 5/2020 | Horsnell | G06F 12/0873 |
| 2021/0073144 A1* | 3/2021 | Guo | G06F 9/45558 |

* cited by examiner

PROCESSING METHOD AND APPARATUS FOR TRANSLATION LOOKASIDE BUFFER FLUSH INSTRUCTION

CROSS-REFERENCE TO RELATED APPLICATIONS

This application claims priority to Chinese Patent Application No. 201910848332.8 filed Sep. 9, 2019, which is incorporated herein in its entirety.

TECHNICAL FIELD

The present invention relates to the processor field, and in particular, to a processor core and a processor having a translation lookaside buffer flush instruction.

BACKGROUND OF THE INVENTION

During a memory access operation performed by an existing processor, a single memory access operation may cause a plurality of page table accesses due to the presence of a paging system. Paging greatly deteriorates processing performance. Therefore, modern processors usually use a translation lookaside buffer (usually referred to as TLB for short) to reduce processing overheads resulting from paging. With the TLB, address information that has been already accessed is cached, to reduce an address translation operation required for accessing a same address the next time. In addition, to reduce overheads of the buffer itself, the processor does not keep the buffer always consistent with a page table in the paging system. This means that if an operating system modifies the page table, the buffer becomes obsolete and unusable. In an existing processing system, especially in an RSIC-V-based processing system, a dedicated TLB flush instruction (also referred to as a TLB purge instruction) is used to notify the processor that the page table cached in the TLB has been changed, so that the processor can flush related TLB entries accordingly, thereby ensuring that cache entries of the TLB are the latest.

The existing processor usually includes a plurality of processor cores, and each processor core has a corresponding hardware thread (hart). An existing TLB flush instruction only works on a hardware thread that executes the current instruction, for example, if one hardware thread during instruction execution changes a page entry being used by another hardware thread, a corresponding page entry cannot be updated by directly executing a TLB flush instruction. Instead, a software interrupt needs to be sent to other hardware threads by using an inter-core interrupt communication mechanism, so that these hardware threads separately execute the TLB flush instruction to update the TLB.

The existing manner is less efficient when the processor has a plurality of processor cores. Therefore, a new TLB flush instruction is needed to make the plurality of processor cores perform a TLB flush operation efficiently.

SUMMARY OF THE INVENTION

In view of this, the present invention provides a new instruction processing apparatus and an instruction processing method, so as to resolve or at least alleviate at least one of the foregoing problems.

According to one aspect of the present invention, an instruction processing apparatus is provided, including a first register, a second register, a decoder, and an execution unit coupled to the first register, the second register, and the decoder. The first register is adapted to store address information, and the second register is adapted to store address space identification information. The decoder is adapted to receive and decode a translation lookaside buffer flush instruction. The translation lookaside buffer flush instruction indicates that the first register serves as a first operand and the second register serves as a second operand. The execution unit executes the decoded translation lookaside buffer flush instruction, so as to acquire the address information from the first register, to acquire the address space identification information from the second register, and to broadcast the acquired address information and address space identification information on a bus coupled to the instruction processing apparatus, so that another processing unit coupled to the bus performs purging on a translation lookaside buffer, corresponding to the address information, in an address space indicated by the address space identification information.

Optionally, in the instruction processing apparatus according to the present invention, the second register further stores a physical page identifier of a root page table, and the execution unit is further adapted to acquire the physical page identifier of the root page table from the second register when executing the flush instruction and send the physical page identifier, the address information, and the address space identification information together to the bus.

Optionally, the instruction processing apparatus according to the present invention further includes a hardware register coupled to the execution unit. The hardware register is adapted to store a virtualization identifier indicating whether a hypervisor (hypervisor) mode is enabled and a permission identifier indicating a running permission mode.

Optionally, in the instruction processing apparatus according to the present invention, when the virtualization identifier indicates that the hypervisor mode is not enabled, the address information stored in the first register is virtual address information, and the physical page identifier stored in the second register is a physical page identifier of a root page table of first-level address translation for translating a virtual address into a physical address. The execution unit is adapted to send the virtual address information, the physical page identifier of the root page table of first-level address translation, and the address space identifier together to the bus.

Optionally, in the instruction processing apparatus according to the present invention, when the virtualization identifier indicates that the hypervisor mode is enabled, and the permission identifier indicates that a current flush instruction is executed in a guest machine, the address information stored in the first register is guest-machine virtual address information, and the physical page identifier stored in the second register is a physical page identifier of the root page table of first-level address translation for translating a guest-machine virtual address into a guest-machine physical address. The execution unit is adapted to acquire, from the hardware register, a virtual machine identifier and a physical page identifier of a root, page table of second-level address translation for translating a guest-machine physical address into a physical address, and send the guest-machine virtual address, the physical page identifier of the root page table of first-level address translation, the address space identifier, the virtual machine identifier, and the physical page identifier of the root page table of second-level address translation together to the bus.

Optionally, in the instruction processing apparatus according to the present invention, the second register further stores a mode identifier. When the virtualization identifier indicates that the hypervisor mode is enabled, the permission identifier indicates that the current flush instruction is executed in a host machine, and the mode identifier indicates a first mode, the address information stored in the first register is virtual address information, and the physical page identifier stored in the second register is a physical page identifier of the root page table of first-level address translation for translating a virtual address into a physical address. The execution unit is adapted to send the virtual address information, the physical page identifier of the root page table of first-level address translation, and the address space identifier together to the bus.

Optionally, in the instruction processing apparatus according to the present invention, when the virtualization identifier indicates that the hypervisor mode is enabled, the permission identifier indicates that the current flush instruction is executed in the host machine, and the mode identifier indicates a second mode, the address information stored in the first register is guest-machine physical address information; the physical page identifier stored in the second register is a physical page identifier of the root page table of second-level address translation for translating a guest-machine physical address into a physical address; and the address space identifier stored in the second register is a virtual machine identifier. The execution unit is adapted to send the guest-machine physical address, the physical page identifier of the root page table of second-level address translation, and the virtual machine identifier together to the bus.

Optionally, in the instruction processing apparatus according to the present invention, the hardware register further stores an enabling identifier indicating whether execution of the translation lookaside buffer flush instruction is allowed. The execution unit is adapted to skip executing the decoded translation lookaside buffer flush instruction when the enabling identifier indicates that execution of the translation lookaside buffer flush instruction is not allowed.

Optionally, in the instruction processing apparatus according to the present invention, a first part of the second register stores the physical page identifier, a second part different from the first part stores the address space identifier, and a third part different from the first and second parts stores the mode identifier.

According to another aspect of the present invention, an input/output IO storage management unit is provided, including a group mapping table in which an association relationship between a domain identifier and a physical page identifier of a root page table is stored. The management unit is adapted to: when receiving, via the bus, a broadcast sent by the instruction processing apparatus according to the present invention, fetch the physical page identifier, look up a domain identifier corresponding to the physical page identifier in the group mapping table, and use the domain identifier and received address information to flush an entry from a corresponding translation lookaside buffer.

According to still another aspect of the present invention, an instruction processing method is provided, including: receiving and decoding a translation lookaside buffer flush instruction. The translation lookaside buffer flush instruction indicates that a first register is a first operand and a second register is a second operand. Then, the method is to execute the decoded translation look aside buffer flush instruction, so as to acquire address information from the first register, to acquire address space identification information from the second register, and to broadcast the acquired address information and address space identification information on a bus, so that another processing unit coupled to the bus performs purging on a translation lookaside buffer, corresponding to the address information, in an address space indicated by the address space identification information.

According to still another aspect of the present invention, an IO storage management method is provided, including: receiving, via a bus, a broadcast sent by using the instruction processing method according to the present invention fetching a physical page identifier of a root page table from the broadcast message, and looking up a domain identifier corresponding to the physical page identifier in a group mapping table, where the group mapping table stores an association relationship between a domain identifier and a physical page identifier of the root page table; and using the found domain identifier and address information that is fetched from the broadcast message to flush an entry from a corresponding translation lookaside buffer.

According to still another aspect of the present invention, a computing system is provided, including a memory and a processor coupled to the memory. The processor includes a register set, a decoder, and an execution unit. The register set includes a first register adapted to store address information and a second register adapted to store address space identification information and a physical page identifier of a root page table. The decoder is adapted to receive and decode a translation lookaside buffer flush instruction. The translation lookaside buffer flush instruction indicates that the first register is a first operand and the second register is a second operand. The execution unit is coupled to, the first register, the second register, and the decoder, and executes the decoded translation lookaside buffer flush instruction, so as to acquire address information from the first register, to acquire the physical page identifier and address space identification information from the second register, and to broadcast the acquired address information, physical page identifier, and address space identification information on a bus coupled to the processor, so that another processing unit coupled to the bus performs purging on a translation lookaside buffer, corresponding to the address information, in an address space indicated by the address space identification information and/or the physical page identifier.

According to still another aspect of the present invention, a machine-readable storage medium is provided. The machine-readable storage medium includes code, and when being executed, the code enables a machine to execute the method according to the present invention.

According to another aspect of the present invention, a system-on-chip is provided, including the instruction processing apparatus according to the present invention.

According to still another aspect of the present invention, an intelligent device is provided, including the system-on-chip according to the present invention.

According to the solutions of the present invention, when a TLB flush instruction is executed in a hardware thread, related information is broadcast on the bus. In this way, another hardware thread coupled to the bus can receive a TLB flush message and perform purging on its corresponding TLB. In a hardware broadcasting manner, efficiency of TLB flush in a plurality of hardware threads can be greatly improved.

In addition, according to the solutions of the present invention, when broadcasting is performed on the bus, in addition to the address space identifier and the virtual address, the physical page identifier of the root page table is further provided. In this way, a processing unit in another hardware thread that receives the broadcast may be properly select one of the address space identifier or the physical page identifier to determine an address space requiring TLB flush. Therefore, the solutions according to the present invention are applicable to various systems and processing units in different modes.

BRIEF DESCRIPTION OF THE DRAWINGS

In order to achieve the above and related objectives, some descriptive aspects are described herein in combination with the following description with reference to the accompanying drawings. These aspects indicate various ways in which the principles disclosed herein can be practiced, and all aspects and their equivalent aspects are intended to fall within the scope of the subject to be protected. The above and other objectives, features and advantages of the present disclosure will become more apparent by reading the following detailed description with reference to the accompanying drawings. Throughout the present disclosure, the same reference numeral generally represents the same part or element.

DETAILED DESCRIPTION OF THE INVENTION

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

Figure 1:
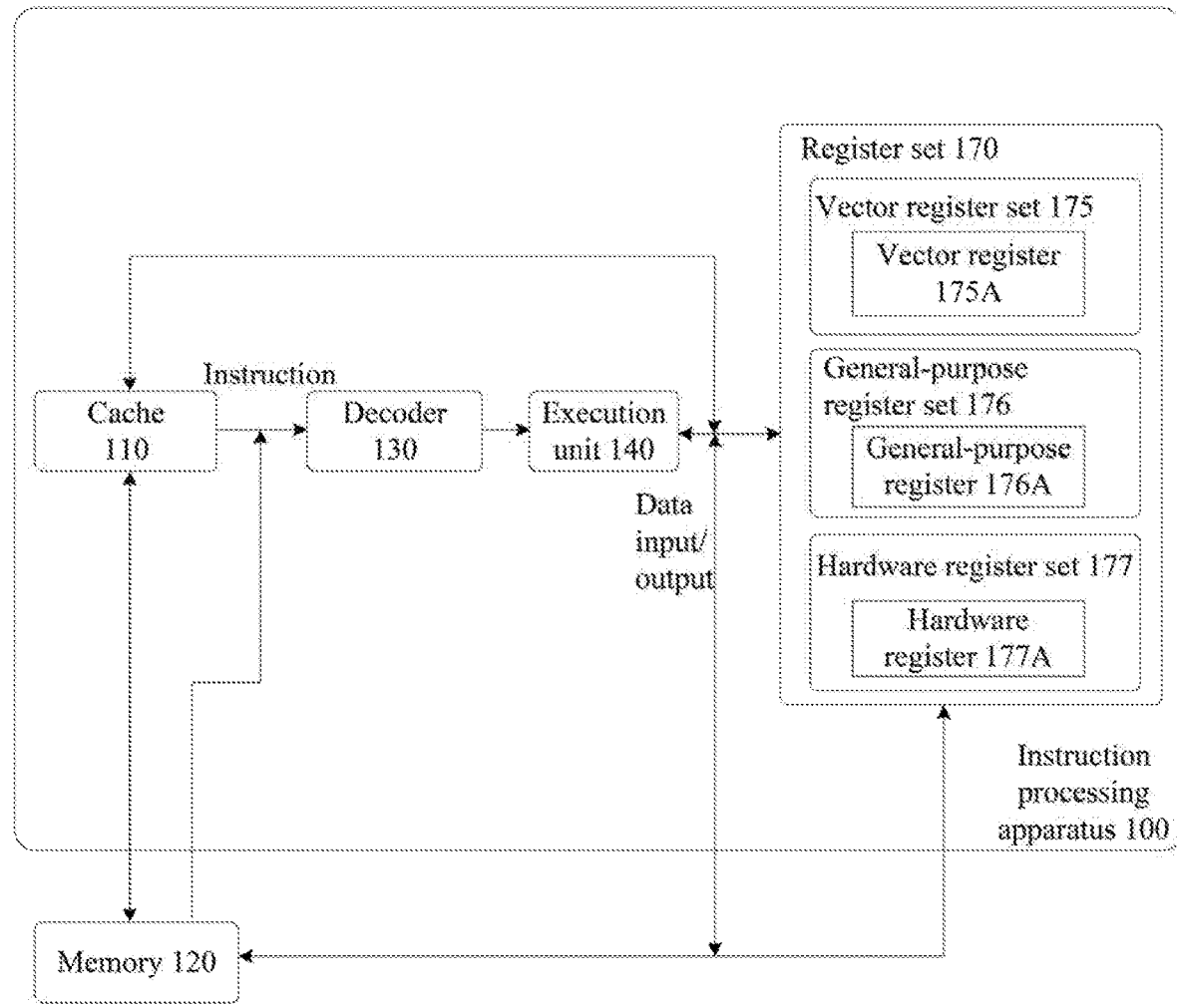
FIG. 1 illustrates a schematic diagram of an instruction processing apparatus according to one embodiment of the present invention.

FIG. 1 illustrates a schematic diagram of an instruction processing apparatus 100 according to one embodiment of the present invention. The instruction processing apparatus 100 has an execution unit 140. The execution unit includes a circuit operable to execute instructions (including a translation lookaside buffer flush instruction described according to the present invention). In some embodiments, the instruction processing apparatus 100 may the a processor, a processor core of a multi-core processor, or a processing element in an electronic system.

A decoder 130 receives incoming instructions in the form of high-level machine instructions or macro-instructions, and decodes these instructions to generate low-level micro-operations, micro-code entry points, micro-instructions, or other low-level instructions or control signals. The low-level instructions or control signals can fulfill operations of high-level instructions through low-level (for example, circuit-level or hardware-level) operations. Various mechanisms may be used to implement the decoder 130. Examples of suitable mechanisms include, but are not limited to, micro-codes, lookup tables, hardware implementations, and programmable logic arrays (PLA). The present invention is not limited to various mechanisms that implement the decoder 130. Any mechanism that can implement the decoder 130 falls within the protection scope of the present invention.

The decoder 130 may receive an incoming instruction from a cache 110, a memory 120, or other sources. Decoded instructions include one or more micro-operations, micro-code entry points, micro-instructions, other instructions, or other control signals, which reflect the received instructions or are derived from the received instructions. These decoded instructions are transmitted to the execution unit 140 and executed by the execution unit 140. When executing these instructions, the execution unit 140 receives data input from a register set 170, the cache 110, and/or the memory 120, and generates data output to the register set 170, the cache 110, and/or the memory 120.

In one embodiment, the register set 170 includes architectural registers, and the architectural registers are also referred to as registers. Unless otherwise specified or as can be clearly known, terms "architectural registers", "register set", and "registers" are used to represent registers that are visible to software and/or programmers (for example, visible to software) and/or specified by macro-instructions to identify operands. These registers are different from other non-architectural registers (for example, temporary registers, reorder buffers, or retirement registers) in a given micro-architecture.

To avoid confusing the description, a relatively simple instruction processing apparatus 100 has been illustrated and described. It should be understood that more than one execution unit may be present in other embodiments. For example, the apparatus 100 may include a plurality of different types of execution units, for example, an arithmetic unit, an arithmetic logic unit (ALU), an integer unit, and a floating point unit. In other embodiments, the instruction processing apparatus or processor may include a plurality of cores, logic processors, or execution engines. A plurality of embodiments of the instruction processing apparatus 100 will be provided later with reference to FIG. 6A to FIG. 9.

According to one embodiment, the register set 170 includes a vector register set 175. The vector register set 175 includes a plurality of vector registers 175A. Each vector register 175A may be 512-bit, 256-bit, or 128-bit wide, or a different vector width may be used. The register set 170 may further include a general-purpose register set 176. The general-purpose register set 176 includes a plurality of general-purpose registers 176A. These general-purpose registers 176A may store operands of translation lookaside buffer flush instructions. The register set 170 further includes a hardware register set 177. The hardware register set 177 includes a plurality of hardware registers 177A. The hardware register 177A may store information indicating a hardware operating state. According to one implementation, when the instruction processing apparatus 100 is a processor core of a multi-core processor, information indicating an operating state of the processor core may be stored in the hardware register 177A. For example, information about a current address translation data structure of the processor core is stored in one hardware register (for example, a satp register in the RSIC-V architecture). When the processor supports virtualization, a virtualization state of a current hardware thread is stored in a plurality of hardware registers (for example, hgatp registers, hstatus registers, hedeleg and hideleg registers, hcounteren registers in the RSIC-V architecture). Values in these hardware registers can be set when the processor core enters a working state, or the working state of the processor core can be changed by setting the values of these hardware registers. The present invention is not limited to a specific definition of the hardware register 177A. Definitions of all registers for which a hardware-related state value of the current processor core or instruction processing apparatus 100 can be acquired from these hardware registers 177A fall within the protection scope of the present invention. It should be understood that different register architectures supporting different register lengths, different register types, and/or different quantities of registers may also be used without going beyond the protection scope of the present invention.

Figure 2:
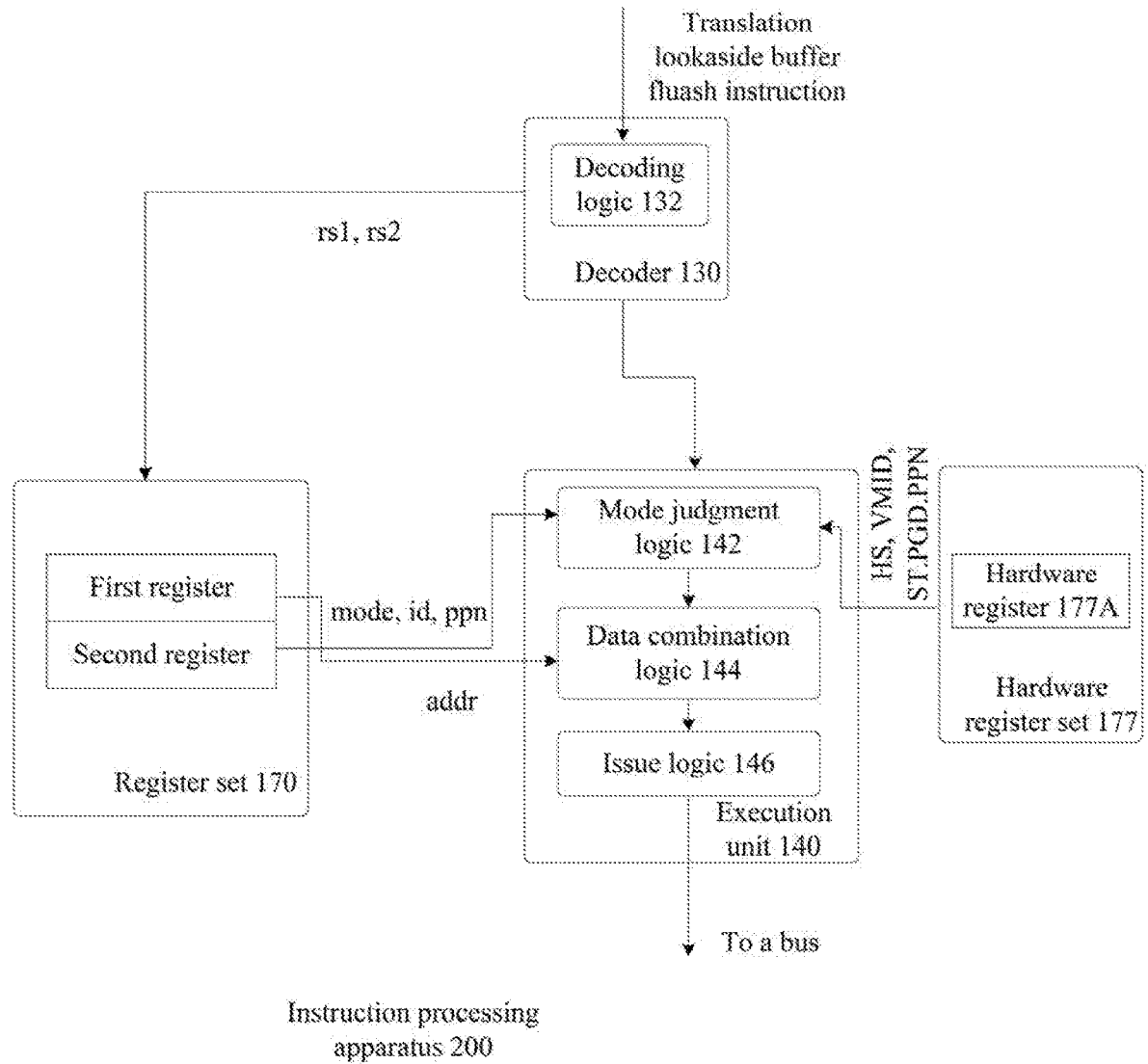
FIG. 2 illustrates a schematic diagram of an instruction processing apparatus according to one embodiment of the present invention.

FIG. 2 illustrates a schematic diagram of an instruction processing apparatus 200 according to one embodiment of the present invention. The instruction processing apparatus 200 shown in FIG. 2 is a further extension of the instruction processing apparatus 100 shown in FIG. 1 and some components are omitted for ease of description. Therefore, the same reference numerals in FIG. 1 are used to indicate the same and/or similar components.

The instruction processing apparatus 200 is adapted to execute a translation lookaside buffer flush instruction. According to one implementation of the present invention, the translation lookaside buffer (TLB) flush instruction is in the following format:

sfence.vma.b rs1 rs2

The TLB flush instruction sfence.vma.b is similar to an existing TLB flush instruction sfence.vma, but has an extension b to indicate that the instruction is to be hardware broadcast on a bus when being executed.

The TLB flush instruction includes a first operand specifying a first register rs1 and a second operand specifying a second register rs2. The first register rs1 stores address information, and the second register rs2 stores address space identification information.

According to one embodiment of the present invention, the first register rs1 and the second register rs2 may be 32-bit registers. However, the present invention is not limited to a register length and type, and all registers in which the address information and address space identification information can be stored fall within the protection scope of the present invention. The following describes the TLB flush instruction by using a 32-bit register as an example, and various aspects described later is also applicable to other types of data.

According to another embodiment, the second register rs2 may store different content in different parts. For example, the rs2 may include at least three parts. A description identifier mode indicating a TLB flush instruction operation mode is stored in a first part, an address space identifier id is stored in a second part, and a physical page identifier (ppn) of a root page table is stored in a third part. For example, when the second register rs2 is a 32-bit register, mode may be stored in the $31^{st}$ bit, id is stored in the $22^{nd}$ to $30^{th}$ bits, and ppn is stored in the $0^{th}$ to $21^{st}$ bits. The address space identifier id and the physical page identifier ppn are used to determine an address space for TLB flush across hardware threads hart, and an address stored in the rs1 is used to determine an address, corresponding to a TLB requiring flush, in the address space determined based on the rs2. With the values of rs1 and rs2, the hardware threads hart can determine to-be-flushed TLB entries.

As shown in FIG. 2, a decoder 130 includes a decoding logic 132. The decoding logic 132 decodes the TLB flush instruction to determine the first register corresponding to rs1 and the second register corresponding to rs2 in the register set 170.

An execution unit 140 includes a mode judgment logic 142, a data combination logic 144, and an issue logic 146. It should be noted that components in the execution unit 140 are divided based on logical functions to be implemented by the execution unit 140, and the present invention is not limited thereto. These logical divisions may be changed in practice according to actual needs, and may even be further split and combined without departing from the protection scope of the present invention.

The mode judgment logic 142 reads the value of the second register rs2. The mode judgment logic 142 also acquires, from the hardware register set 177, a hardware state related to the hardware thread of the current execution instruction, and determines various data to be sent to the data combination logic 144. The data combination logic 144 reads the address information stored in the first register rs1 and combines the read address information with the data acquired from the mode judgment logic 142. Then, the issue logic 146 issues the combined data to the bus, so as to broadcast the combined data on the bus. In this way, other processing units coupled to the same bus can receive the broadcast, fetch content from a received broadcast message, and perform TLB flush locally based on the content.

According to one embodiment, the issue logic 146 may use, for example, a distributed virtual memory (DVM) proposed by the ARM company to broadcast a TLB flush message on the bus, and content of the broadcast message is organized according to the DVM specifications. However, it should be noted that the present invention is not limited thereto, and all manners in which messages can be broadcast on the bus to enable all processing units coupled to the bus to receive the broadcast messages fall within the protection scope of the present invention.

According to one embodiment, the mode judgment logic 142 sends the address space identifier to the data combination logic 144, so that the data combination logic 144 sends the address space identifier and the address information together to the bus. In this way, another processing unit coupled to the bus performs purging on a translation lookaside buffer, corresponding to the address information, in an address space indicated by the address space identification information.

In this manner, broadcasting is performed on the bus, to instruct hardware threads with affected TLB entries in a hardware manner to perform TLB refresh, thereby greatly improving efficiency of TLB refresh.

According to another embodiment, the mode judgment logic 142 also acquires the physical page identifier ppn of the root page table from the second operand, and also sends ppn information to the data combination logic 144, so that the data combination logic 144 sends the address space identifier, the ppn information, and the address information together to the bus. Some of the execution units that receive the TLB flush message from the bus may determine the address space based on the address space identifier, and others may determine the address space based on the ppn. These two types of information are provided on the bus, so that more types of execution units can perform a TLB flush operation based on a bus message. Therefore, this is applicable to more processing systems.

The following describes in detail specific embodiments in which the mode judgment logic 142 determines, based on the hardware state, various data to the sent to the data combination logic 144.

Embodiment 1

According to one embodiment, the hardware state includes a virtualization identifier indicating whether a hypervisor (hypervisor) mode is enabled. When the virtualization identifier indicates that hypervisor mode is not enabled, an operation mode mode acquired from the second operand should be limited to a first operation mode (for example, mode=0). According to one implementation, in this case, a value of the operation mode mode may not be considered. Alternatively, when the mode value does not indicate the first operation mode, a fault occurs in the instruction processing apparatus 100 and subsequent exception handling is performed. The present invention is not limited thereto.

Correspondingly, in this case, the physical page identifier stored in the second register rs2 is a physical page identifier (FT.PGD.PPN) of a root page table of first-level address translation for translating a virtual address into a physical address, the address space identifier stored in the second register rs2 is an address space identifier asid, and the address information stored in the register rs1 is virtual address information vaddr. The data combination logic 144 sends vaddr, FT.PGD.PPN, and asid to the bus for broadcasting to other execution units coupled to the bus.

Embodiment 2

According to another embodiment, when the virtualization identifier indicates that the hypervisor mode is enabled, the hardware state further includes a permission identifier indicating a running permission mode of the current instruction processing apparatus 100. For example, the permission identifier indicates both an execution state of the instruction processing apparatus 100 on a guest machine and an execution state of the instruction processing apparatus 100 on a host machine.

When the mode judgment logic 142 determines, based on the permission identifier, that the instruction processing apparatus 100 is currently being executed on the guest machine, the operation mode mode acquired from the second operand should be limited to the first operation mode (for example, mode=0).

In this case, the physical page identifier stored in the second register rs2 is a physical page identifier (FT.PGD.PPN) of a root page table of first-level address translation for translating a guest-machine virtual address into a guest-machine physical address, the address space identifier stored in the second register rs2 is an address space identifier asid, and the address information stored in the register rs1 is virtual address information vaddr.

In addition, the mode judgment logic 142 further acquires, from the hardware register 177, a current virtual machine identifier (VMID) and a physical page identifier (ST.PGD.PPN) of a root page table of second-level address translation for translating a guest-machine physical address to a physical address. The data combination logic 144 sends vaddr, FT.PGD.PPN, asid, VMID, and PGD.PPN to the bus for broadcasting to other execution units coupled to the bus.

After the hypervisor mode is enabled, for the instruction processing apparatus executed in a guest machine manner, the address space can be determined by using a combination of asid and vmid, or by using two-level address translation (that is, by using FT.PGD.PPN and ST.PGD.PPN), so that other execution units receiving the broadcast message can determine the to-be-flushed TLB entries based on the foregoing information.

Embodiment 3

According to another embodiment, when the virtualization identifier indicates that the hypervisor mode is enabled, and the permission identifier indicates that the instruction processing apparatus 100 is executed on the guest machine, the judgment logic 142 performs different operation processing based on the value of the operation mode mode acquired from the second operand.

When the value of mode indicates the first operation mode (for example, mode=0), that is, when the host machine normally broadcasts a TLB flush message, the physical page identifier stored in the second register rs2 is a physical page identifier (FT.PGD.PPN) of the root page table of first-level address translation for translating a virtual address into a physical address, the address space identifier stored in the second register rs2 is an address space identifier asid, and the address information stored in the register rs1 is virtual address information vaddr. The data combination logic 144 sends vaddr, FT.PGD.PPN, and asid to the bus for broadcasting to other execution units coupled to the bus.

When the value of mode indicates a second operation mode (for example, mode=1), that is, when, the host machine attempts to broadcast a TLB flush message to other guest machines residing on the host machine, the physical page identifier stored in the second register rs2 is a physical page identifier (ST.PGD.PPN) of the root page table of second-level address translation for translating a guest-machine physical address into a physical address, the address space identifier stored in the second register rs2 is a virtual machine identifier VMID, and the address information stored in the register rs1 is a guest-machine physical address GPA. The data combination logic 144 sends VMID, ST.PGD.PPN, and GPA to the bus for broadcasting to other execution units coupled to the bus, especially to other guest machines residing on the host machine. Because a corresponding asid and FT.PGD.PPN are included in other guest machines, when the TLB flush message can be received on the bus, the to-be-flushed TLB entry can be determined based on VMID, ST.PGD.PPN, and GPA that are fetched from the message and asid and FT.PGD.PPN that are locally retained.

With reference to Embodiments 1 to 3, the foregoing describes manners in which the execution unit 140 provides operands to the registers for translation lookaside buffer flush instructions in various operating states, so that an appropriate TLB flush message can be issued in various states for the translation lookaside buffer flush instruction (sfence.vma.b) and the processing units that receive the flush message can flush a corresponding TLB entry according to the TLB flush message.

In addition, considering that broadcasting the TLB flush message on the bus during execution of the TLB flush instruction results in message transmission and processing overheads on the bus, an instruction enabling identifier may be set in the hardware register 177 to control whether to allow execution of the TLB flush instruction (sfence.vma.b) according to one implementation of the present invention. The execution unit 140 determines, based on a value of the enabling identifier, whether to execute the TLB flush instruction. When the instruction enabling identifier indicates that execution of the TLB flush instruction is not allowed (for example, the enabling identifier is set to 0), the execution unit 140 does not execute the instruction, and optionally generates fault information.

Figure 3:
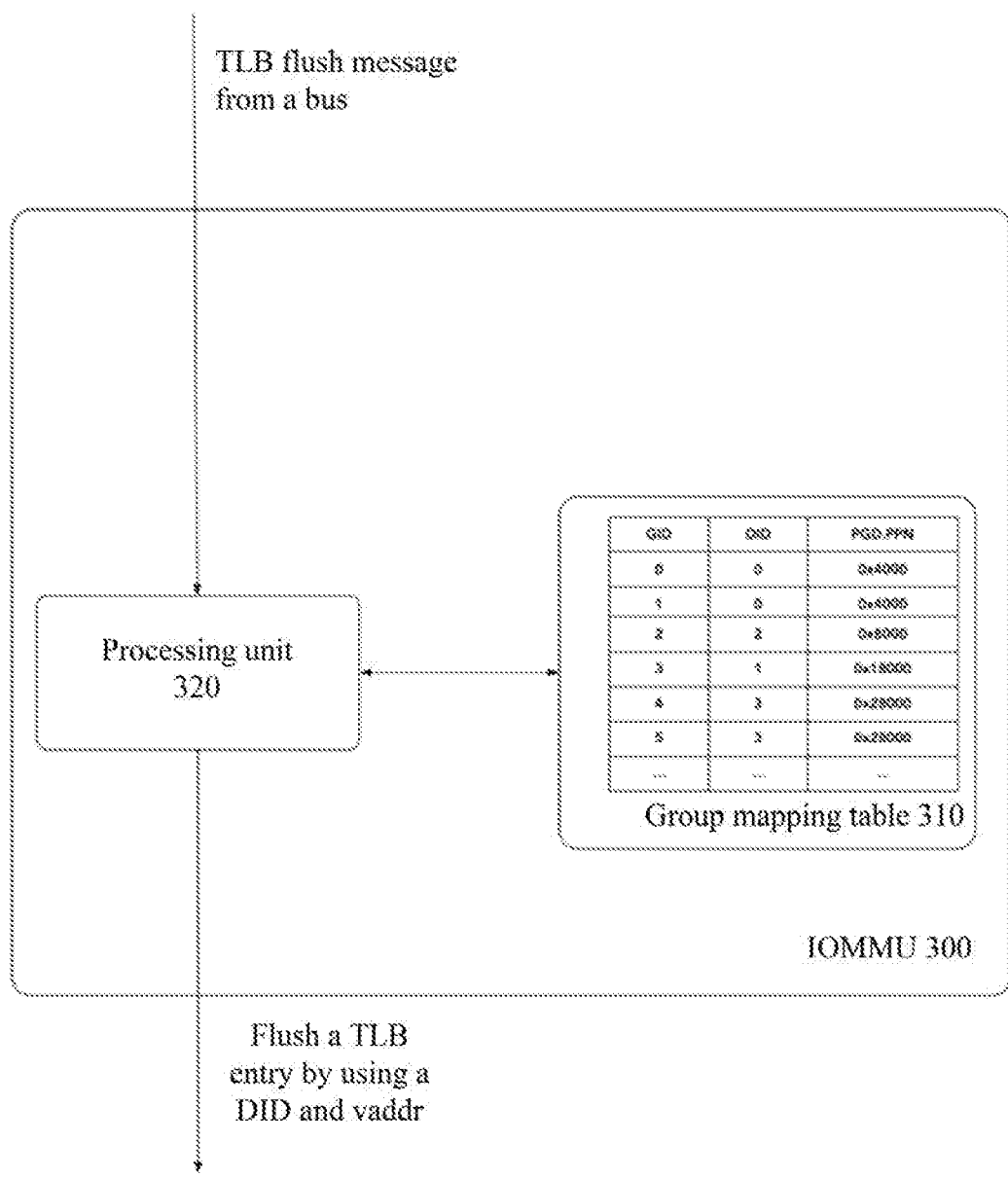
FIG. 3 illustrates a schematic diagram of an IO storage management unit according to one embodiment of the present invention.

FIG. 3 illustrates a schematic diagram of an IO storage management unit 300 according to one embodiment of the present invention. The IO storage management unit, namely, IOMMU 300, is adapted to: when a hypervisor mode is not enabled, process a TLB flush broadcast message received from a bus.

As shown in FIG. 3, the IOMMU 300 includes a group mapping table 310. An association relationship between a domain identifier (DID) and a physical page identifier (PGD.PPN) of a root page table is stored in the group mapping table 310.

The IOMMU 300 further includes a processing unit 320. The processing unit 320 receives a broadcast including a TLB flush message (for example, according to the DVM specifications) from the bus, and fetches a physical page identifier (PGD.PPN) from the message, looks up a domain identifier DID corresponding to the physical page identifier PGD.PPN in the group mapping table 310, and uses the domain identifier DID and address information vaddr that is fetched from the broadcast to flush an entry from a corresponding translation lookaside buffer TLB.

For the IOMMU 300 shown in FIG. 3, the IOMMU can merely identify the PGD.PPN. If the TLB flush message does not include the physical page identifier, TLB entries managed by the IOMMU cannot be refreshed. Therefore, the physical page identifier is added to the message, so that different processing units can properly process local TLB entries, implementing efficient TLB flush across hardware threads.

Figure 4:
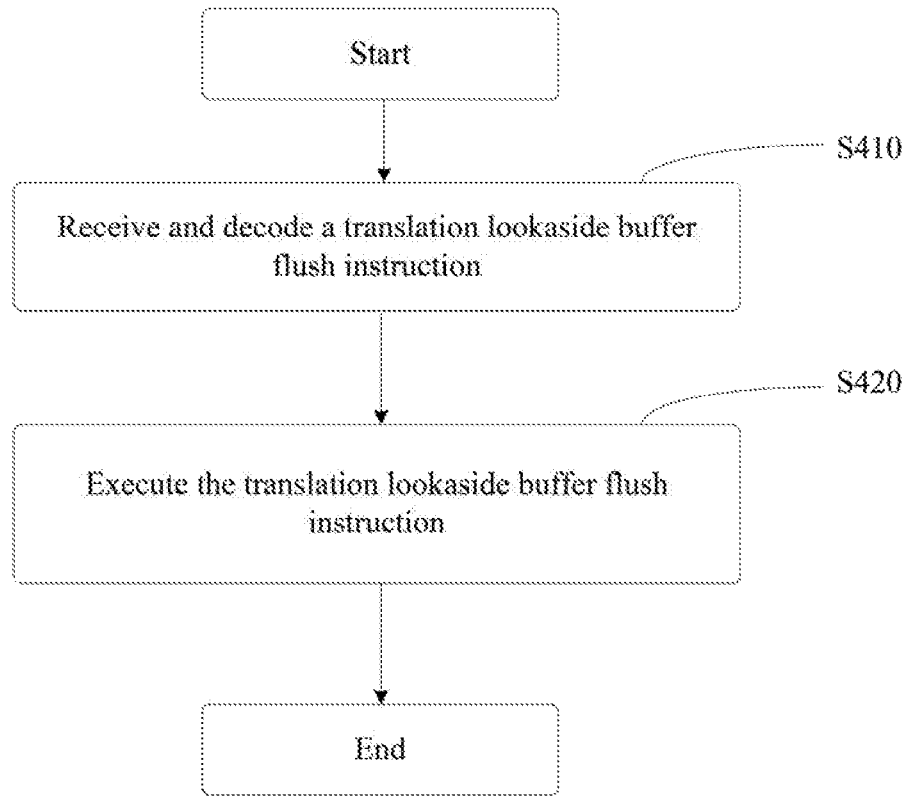
FIG. 4 illustrates a schematic diagram of an instruction processing method according to one embodiment of the present invention.

FIG. 4 illustrates a schematic diagram of an instruction processing method 400 according to one embodiment of the present invention. The instruction processing method described in FIG. 4 is applicable to the instruction processing apparatus, the processor core, the processor computer system, and the system-on-chip described with reference to FIG. 1, FIG. 2, and FIG. 6A to FIG. 9, and is applicable for executing the translation lookaside buffer flush instruction described above.

As shown in FIG. 4, the method 400 starts from step S410. In step S410, a translation lookaside buffer flush instruction is received and decoded.

According to one implementation of the present invention, the translation lookaside buffer (TLB) flush instruction is in the following format:

sfence.vma.b rs1 rs2

The TLB flush instruction sfence.vma.b is similar to an existing TLB flush instruction sfence.vma, but has an extension b to indicate that the instruction is to be hardware broadcast on a bus when being executed.

The TLB flush instruction includes a first operand specifying a first register rs1 and a second operand specifying a second register rs2. The first register rs1 stores address information, and the second register rs2 stores address space identification information.

According to another embodiment, the second register rs2 may store different content in different parts. For example, the rs2 may include at least three parts. A description identifier mode indicating a TLB flush instruction operation mode is stored in a first part, an address space identifier id is stored in a second part, and a physical page identifier (ppn) of a root page table is stored in a third part. The address space identifier id and the physical page identifier ppn are used to determine an address space for TLB flush across hardware threads hart, and an address stored in the rs1 is used to determine an address, corresponding to a TLB requiring flush, in the address space determined based on the rs2. With the values of rs1 and rs2, the hardware threads hart can determine to-be-flushed TLB entries.

Then, in step 420, the translation lookaside buffer flush instruction decoded in step S410 is executed, so as to acquire the address information from the first register rs1, to acquire the address space identification information from the second register rs2, and to broadcast the acquired address information and address space identification information on a bus, so that another processing unit coupled to the bus performs purging on a translation lookaside buffer, corresponding to the address information, in an address space indicated by the address space identification information.

In this manner, broadcasting is performed on the bus, to instruct hardware threads with affected TLB entries in a hardware manner to perform TLB refresh, thereby greatly improving efficiency of TLB refresh.

According to one embodiment, in step S420, for example, a DVM proposed by the ARM company may be used to broadcast the TLB flush message on the bus, and content of the broadcast message is organized according to the DVM specifications. However, it should be noted that the present invention is not limited thereto, and all manners in which messages can be broadcast on the bus to enable all processing units coupled to the bus to receive the broadcast messages fall within the protection scope of the present invention.

According to another embodiment, in step S420, the physical page identifier ppn of the root page table is further acquired from the second operand. The address space identifier, ppn information, and address information are sent together to the bus. Some of the execution units that receive the TLB flush message from the bus may determine the address space based on the address space identifier, and others may determine the address space based on the ppn. These two types of information are provided on the bus, so that more types of execution units can perform TLB flush operation based on a bus message. Therefore, this is applicable to more processing systems.

In addition, optionally, in step S420, specific content of the TLB flush message broadcast on the bus is further determined based on a hardware state. The foregoing describes specific content of the message that can be broadcast in step S420 in various hardware states with reference to Embodiments 1 to 3, and details are not described herein again.

According to one embodiment of the present invention, considering that broadcasting the TLB flush message on the bus during execution of the TLB flush instruction results in message transmission and processing overheads on the bus, an instruction enabling identifier may be set in a hardware register 177 to control whether to allow execution of the TLB flush instruction (sfence.vma.b) according to one implementation of the present invention. In step S420, whether to execute the TLB flush instruction is determined based on a value of the enabling identifier. When the instruction enabling identifier indicates that execution of the TLB flush instruction is not allowed (for example, the enabling identifier is set to 0), the instruction is not executed, and optionally limit information is generated.

Figure 5:
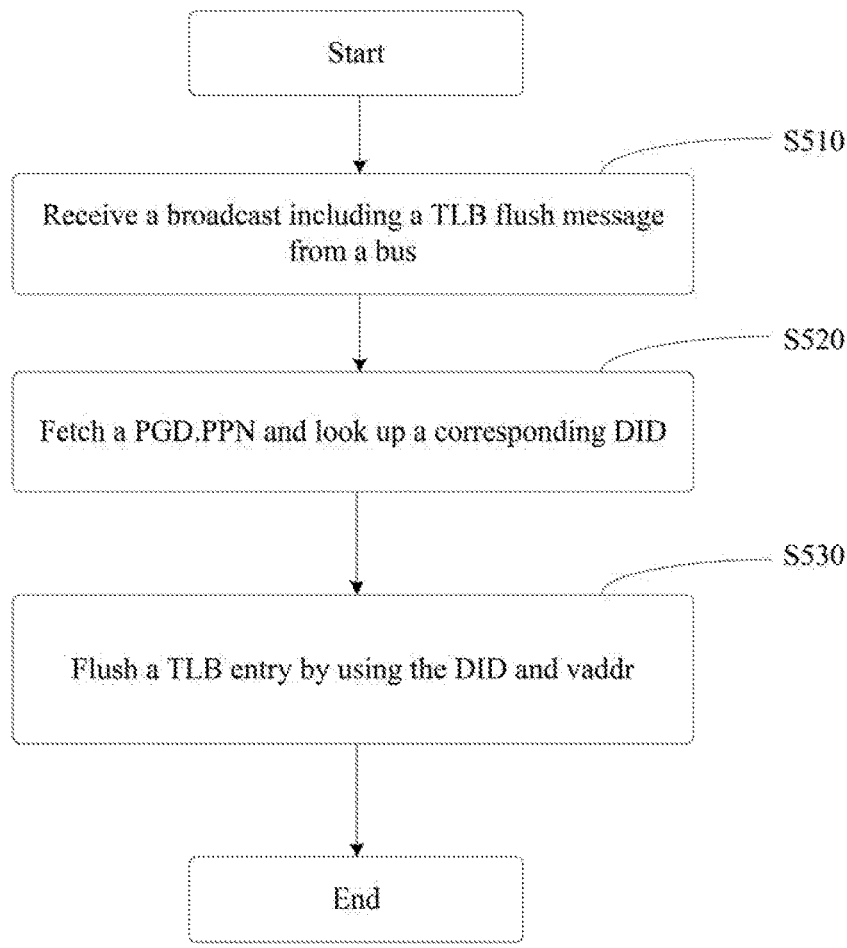
FIG. 5 illustrates a schematic diagram of an IO storage management method according to one embodiment of the present invention.

The foregoing describes manners in which operands are provided to registers for translation lookaside buffer flush instructions in various operating states, so that an appropriate TLB flush message can be issued in various states when the translation lookaside buffer flush instruction (sfence.vma.b) is executed by using the method 400. FIG. 5 illustrates a schematic diagram of an IO storage management method 500 according to one embodiment of the present invention. The IO storage management method is executed in the IO storage management unit, namely IOMMU 300, and is applicable for processing, when a hypervisor mode is not enabled, a TLB flush broadcast message received from a bus.

As shown in FIG. 5, the method 500 starts from step S510. In step S510, a broadcast including a TLB flush message (for example, according to the DVM specifications) is received from the bus. Then, in step S520, a physical page identifier (PGD.PPN) is fetched from the message, a domain identifier DID corresponding to the physical page identifier PGD.PPN is looked up in the group mapping table 310 described with reference to FIG. 3. In step S530, a domain identifier DID and address information vaddr that is fetched from the broadcast are used to flush an entry from a corresponding translation lookaside buffer TLB.

As described above, the instruction processing apparatus according to the present invention may be implemented as a processor core, and the instruction processing method may be executed in the processor core. The processor core can be implemented in different manners in different processors. For example, the processor core may be implemented as a general-purpose in-order core for general-purpose computing, a high-performance general-purpose out-of-order core for general-purpose computing, and a dedicated core for graphics and/or scientific (throughput) computing. The processor may be implemented as a Central Processing Unit (CPU) and/or a coprocessor. The CPU may include one or more general-purpose in-order cores and/or one or more general-purpose out-of-order cores, and the coprocessor may include one or more dedicated cores. A combination of such different processors may lead to different computer system architectures. In one computer system architecture, the coprocessor is located on a chip separate from the CPU. In another computer system architecture, the coprocessor is located in the same package as the CPU but on a separate die. In another computer system architecture, the coprocessor is located on the same die as the CPU (in this case, such a coprocessor is sometimes referred to as a dedicated logic such as an integrated graphics and/or a scientific (throughput) logic, or referred to as a dedicated core). In another computer system architecture referred to as a system-on-chip, the described CPU (sometimes referred to as an application core or application processor), the coprocessor described above, and additional functions may be included in the same die. An exemplary core architecture, processor, and computer architecture will be described later with reference to FIG. 6A to FIG. 9.

Figure 6A:
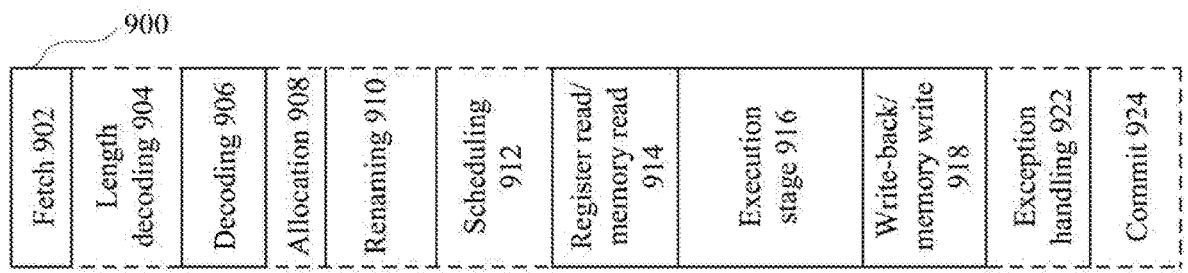
FIG. 6A illustrates a schematic diagram of an instruction processing pipeline according to one embodiment of the present invention.
Figure 6B:
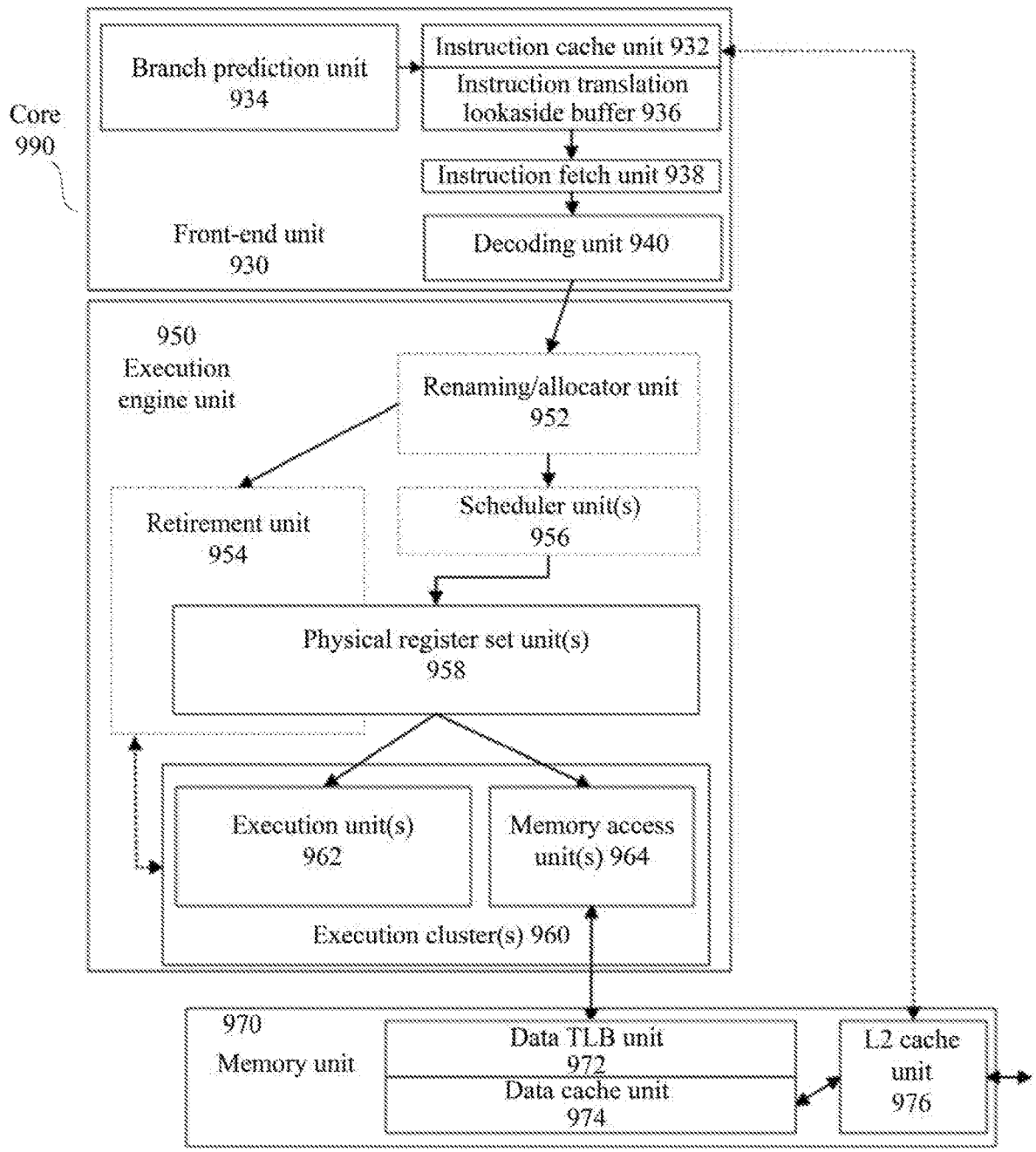
FIG. 6B illustrates a schematic diagram of a processor core architecture according to one embodiment of the present invention.

FIG. 6A illustrates a schematic diagram of an instruction processing pipeline according to an embodiment of the present invention. The pipeline includes an in-order pipeline and, an out-of-order issue/execution pipeline. FIG. 6B illustrates a schematic diagram of a processor core architecture according to an embodiment of the present invention. The processor core architecture includes an in-order architecture core and an out-of-order issue/execution architecture core related to register renaming. In FIG. 6A and FIG. 6B, the in-order pipeline and the in-order core are illustrated in a solid line box, while the out-of-order issue/execution pipeline and core are illustrated as optional additional items in a dashed line box.

As shown in FIG. 6A, a processor pipeline 900 includes a fetch stage 902, a length decoding stage 904, a decoding stage 906, an allocation stage 908, a renaming stage 910, a scheduling (also known as dispatching or issue) stage 912, a register read/memory read stage 914, an execution stage 916, a write-back/memory write stage 918, an exception handling stage 922, and a commit stage 924.

As shown in FIG. 6B, a processor core 990 includes an execution engine unit 950 and a front-end unit 930 coupled to the execution engine unit 950. Both the execution engine unit 950 and the front-end unit 930 are coupled to a memory unit 970. The core 990 may be a Reduced Instruction Set Computing (RISC) core, a Complex Instruction Set Computer (CISC) core, a Very Long Instruction Ward (VLIW) core, or a hybrid or alternative core type. Optionally, the core 990 may be a dedicated core, for example, a network or communication core, a compression engine, a coprocessor core, a General-Purpose Graphics Processing Unit (GPGPU) core, or a Graphics Processing Unit (GPU) core.

The front-end unit 930 includes a branch prediction unit 934, an instruction cache unit 932 coupled to the branch prediction unit 934, an instruction translation lookaside buffer (TLB) 936 coupled to an instruction cache unit 932, an instruction fetch unit 938 coupled to the instruction translation lookaside buffer 936, and a decoding unit 940 coupled to the instruction fetch unit 938. The decoding unit (or decoder) 940 may decode an instruction and generate one or more micro-operations, micro-code entry points, micro-instructions, other instructions, or other control signals decoded from or otherwise reflecting or derived from the original instruction, as an output. The decoding unit 940 may be implemented by using various mechanisms, including but not limited to a lookup table, hardware implementation, Programmable Logic Array (PLA), micro-code Read-Only Memory (ROM), and the like. In one embodiment, the con 990 includes a micro-code ROM or other media that store micro-codes of some macro-instructions (for example, in the decoding unit 940 or otherwise in the front-end unit 930). The decoding unit 940 is coupled to a renaming/allocator unit 952 in the execution engine unit 950.

The execution engine unit 950 includes the renaming/allocator unit 952. The renaming/allocator unit 952 is coupled to a retirement unit 954 and one or more scheduler units 956. The scheduler unit 956 represents any number of different schedulers, including reservation stations, central instruction windows, and so on. The scheduler unit 956 is coupled to each physical register set unit 958. Each physical register set unit 958 represents one or more physical register sets. Different physical register sets store one or more different types of data, such as scalar integers, scalar floating points, packed integer, packed floating points, vector integers, vector floating points, or states (for example, an instruction pointer being the address of the next instruction to be executed). In one embodiment, the physical register set unit 958 includes a vector register unit, a write mask register unit, and a scalar register unit. These register units can provide architectural vector registers, vector mask registers, and general-purpose registers. The physical register set unit 958 is covered by the retirement unit 954 to show various manners in which register renaming and out-of-order execution can be implemented (for example, using a reorder buffer and a retirement register set; using a future file, a history buffer and a retirement register set; or using a register map and a register pool). The retirement unit 954 and the physical register set unit 958 are coupled to an execution cluster 960. The execution cluster 960 includes one or more execution units 962 and one or more memory access units 964. The execution unit 962 may execute various operations (for example, shifting, addition, subtraction, and multiplication), and execute operations on various types of data (for example, scalar floating points, packed integers, packed floating points, vector integers, and vector floating points). Although some embodiments may include a plurality of execution units dedicated to a particular function or set of functions, other embodiments may include only one execution unit or a plurality of execution units that execute all functions. In some embodiments, because separate pipelines (for example, scalar integer pipelines, scalar floating point/ packed integer/packed floating point/vector integer/vector floating point pipelines, and/or memory access pipelines that each have their own scheduler unit, physical register set unit and/or execution cluster) are created for some types of data/operations, a plurality of scheduler units 956, a plurality of physical register set units 958, and a plurality of execution clusters 960 may be present. It should also be understood that, in a case of separate pipelines, one or more of these pipelines may be out-of-order issue/execution pipelines, and the rest may be in-order issue/execution pipelines.

The memory access unit 964 is coupled to a memory unit 970. The memory unit 970 includes a data TLB unit 972, a data cache unit 974 coupled to the data TLB unit 972, and a level-2 (L2) cache unit 976 coupled to the data cache unit 974. In one exemplary embodiment, the memory access unit 964 may include a loading unit, an address storage unit, and a data storage unit, each of which is coupled to the data TLB unit 972 in the memory unit 970. The instruction cache unit 932 may also be coupled to the level-2 (L2) cache unit 976 in the memory unit 970. The L2 cache unit 976 is coupled to one or more caches of other levels, and is eventually coupled to a main memory.

As an example, the core architecture described above with reference to FIG. 6B may implement the pipeline 900 described above with reference to FIG. 6A in the following way: (1) the instruction fetch unit 938 executes the fetch and length decoding stages 902 and 904; (2) the decoding unit 940 executes the decoding stage 906; (3) the renaming/ allocator unit 952 executes the allocation stage 908 and the renaming stage 910; (4) the scheduler unit 956 executes the scheduling stage 912; (5) the physical register set unit 958 and the memory unit 970 execute the register read/memory read stage 914; and the execution cluster 960 executes the execution stage 916; (6) the memory unit 970 and the physical register set unit 958 execute the write-back/ memory write stage 918; (7) each unit may be involved in the exception handling stage 922; and (8) the retirement unit 954 and the physical register set unit 958 execute the commit stage 924.

The core 990 can support one or more instruction sets (for example, an x86 instruction set (with some extensions added with a newer version); MIPS instruction sets of MIPS Technologies company; and instruction sets of ARM Holdings (with optional additional extensions such as NEON)), which include the instructions described herein. It should be understood that the core can support multi-threading (executing two or more parallel sets of operations or threads) and can implement the multi-threading in a variety of manners, including time division multi-threading, simultaneous multi-threading (in which a single physical core provides a logical core for each of threads subjected to the simultaneous multi-threading performed by the physical core), or a combination thereof (for example, time division fetching and decoding, and then simultaneous multi-threading by using, for example, a hyper-threading technology).

Figure 7:
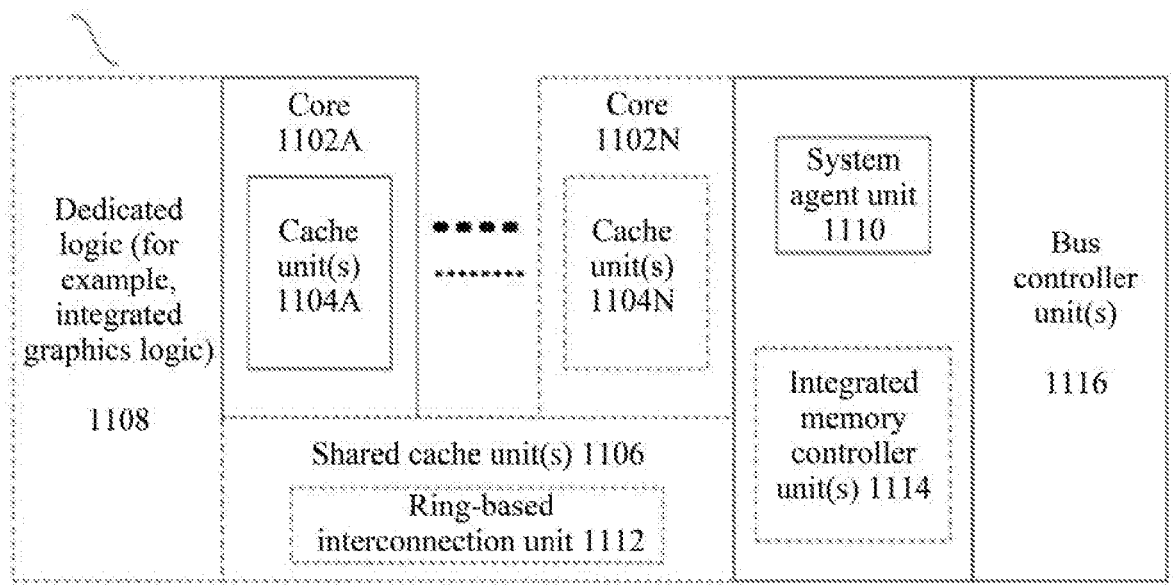
FIG. 7 illustrates a schematic diagram of a processor according to one embodiment of the present invention.

FIG. 7 illustrates a schematic diagram of a processor 1100 according to one embodiment of the present invention. As illustrated by a solid line box in FIG. 7, according to one implementation, the processor 1100 includes a single core 1102A, a system agent unit 1110, and a bus controller unit 1116. As illustrated in a dashed line box in FIG. 7, according to another implementation of the present invention, the processor 1100 may also include a plurality of cores 1102A to 1102N, an integrated memory controller unit 1114 in the system agent unit 1110, and a dedicated logic 1108.

According to one implementation, the processor 1100 may be implemented as a Central Processing Unit (CPU). The dedicated logic 1108 is integrated graphics and/or scientific (throughput) logic (which may include one or more cores), and the cores 1102A to 1102N are one or more general-purpose cores (for example, general-purpose in-order cores, general-purpose out-of-order cores, or a combination thereof).

According to another implementation, the processor 1100 may be implemented as a coprocessor, and the cores 1102A to 1102N are a plurality of dedicated cores for graphics and/or scientific (throughput). According to still another implementation, the processor 1100 may be implemented as a coprocessor, and the cores 1102A to 1102N are a plurality of general-purpose in-order cores. Therefore, the processor 1100 may be a general-purpose processor, a coprocessor or a dedicated processor, for example, a network or communication processor, a compression engine, a graphics processing unit, a General-Purpose Graphics Processing Unit (GPGPU), a high-throughput Many Integrated Core (MIC) coprocessor (including 30 or more cores), or an embedded processor. The processor can be implemented on one or more chips. The processor 1100 may be a part of one or more substrates, and/or may be implemented on one or more substrates by using any one of a plurality of processing technologies, for example, BiCMOS, CMOS, or NMOS.

The memory hierarchy includes one or more levels of caches in each core, one or more shared cache units 1106, and an external memory (not shown) coupled to the integrated memory controller unit 1114. The shared cache unit 1106 may include one or more caches of intermediate levels, such as caches of level 2 (L2), level 3 (L3), level 4 (L4) or other levels, a Last Level Cache (LLC), and/or a combination thereof. Although in one embodiment, a ring-based interconnection unit 1112 interconnects the integrated graphics logic 1108, the shared cache unit 1106 and the system agent unit 1110/integrated memory controller unit 1114, the present invention is not limited thereto, and any quantity of well-known technologies may be used to interconnect these units.

The system agent unit 1110 includes components that coordinate and operate the cores 1102A to 1102N. The system agent unit 1110 may include, for example, a Power Control Unit (PCU) and a display unit. The PCU may include logic and components required for adjusting the power states of the cores 1102A to 1102N and the integrated graphics logic 1108. The display unit is used to drive one or more externally connected displays.

The cores 1102A to 1102N may have a core architecture described above with reference to FIG. 6A and FIG. 6B, and may be homogenous or heterogeneous in terms of the architecture instruction set. That is, two or more of these cores 1102A to 1102N may be capable of executing the same instruction set, while other cores may be capable of executing only subsets of this instruction set or a different instruction set.

Figure 8:
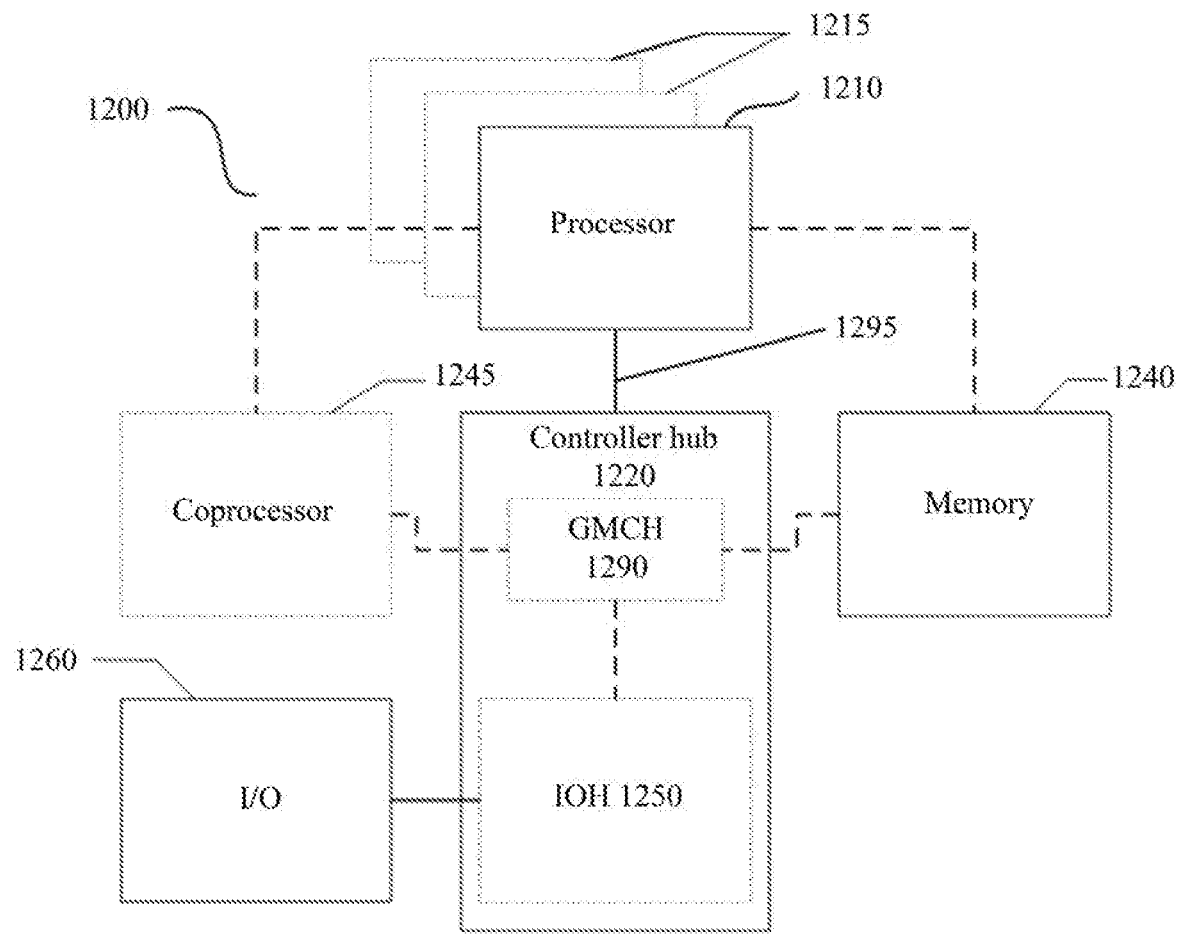
FIG. 8 illustrates a schematic diagram of a computer system according to one embodiment of the present invention.

FIG. 8 illustrates a schematic diagram of a computer system 1200 according to one embodiment of the present invention. The computer system 1200 shown in FIG. 8 may be applied to laptops, desktop computers, hand-held PCs, personal digital assistants, engineering workstations, servers, network devices, network hubs, switches, embedded processors, digital signal processors (DSPs), graphics devices, video game devices, set-top boxes, microcontrollers, cellular phones, portable media players, hand-held devices, and various other electronic devices. The present invention is not limited thereto, and all systems capable of incorporating the processors and/or other execution logic disclosed in the specification are included in the protection scope of the present invention.

As shown in FIG. 8, the system 1200 may include one or more processors 1210 or 1215. These processors are coupled to a controller hub 1220. In one embodiment, the controller hub 1220 includes a Graphics Memory Controller Hub (GMCH) 1290 and an Input/Output (IOH) 1250 (which may be located on separate chips). The GMCH 1290 includes a memory controller and a graphics controller that are coupled to a memory 1240 and a coprocessor 1245. The IOH 1250 couples an Input/Output (I/O) device 1260 to the GMCH 1290. Alternatively, the memory controller and the graphics controller are integrated in the processor, so that the memory 1240 and the coprocessor 1245 are directly coupled to the processor 1210. In this case, the controller hub 1220 includes only the IOH 1250.

The optional nature of the additional processor 1215 is denoted by dashed lines in FIG. 8. Each processor 1210 or 1215 may include one or more processor cores described herein, and may be a version of the processor 1100.

The memory 1240 may be, for example, a Dynamic Random Access Memory (DRAM), a Phase Change Memory (PCM), or a combination thereof. In at least one embodiment, the controller hub 1220 communicates with the processors 1210 or 1215 via a multi-drop bus (multi-drop bus) such as a Front Side Bus (FSB), a point-to-point interface such as a Quick Path Interconnect (QPI), or a similar connection 1295.

In one embodiment, the coprocessor 1245 is a dedicated processor, for example, a high-throughput MIC processor, a network or communication processor, a compression engine, a graphics processing unit, a GPGPU, or an embedded processor. In one embodiment, the controller hub 1220 may include an integrated graphics accelerator.

In one embodiment, the processor 1210 executes instructions that control a general type of data processing operations. What are embedded in these instructions may be coprocessor instructions. The processor 1210 identifies, for example, these coprocessor instructions of types that should be executed by the attached coprocessor 1245. Therefore, the processor 1210 issues these coprocessor instructions (or control signals representing coprocessor instructions) to the coprocessor 1245 over a coprocessor bus or other interconnects. The coprocessor 1245 receives and executes the received coprocessor instructions.

Figure 9:
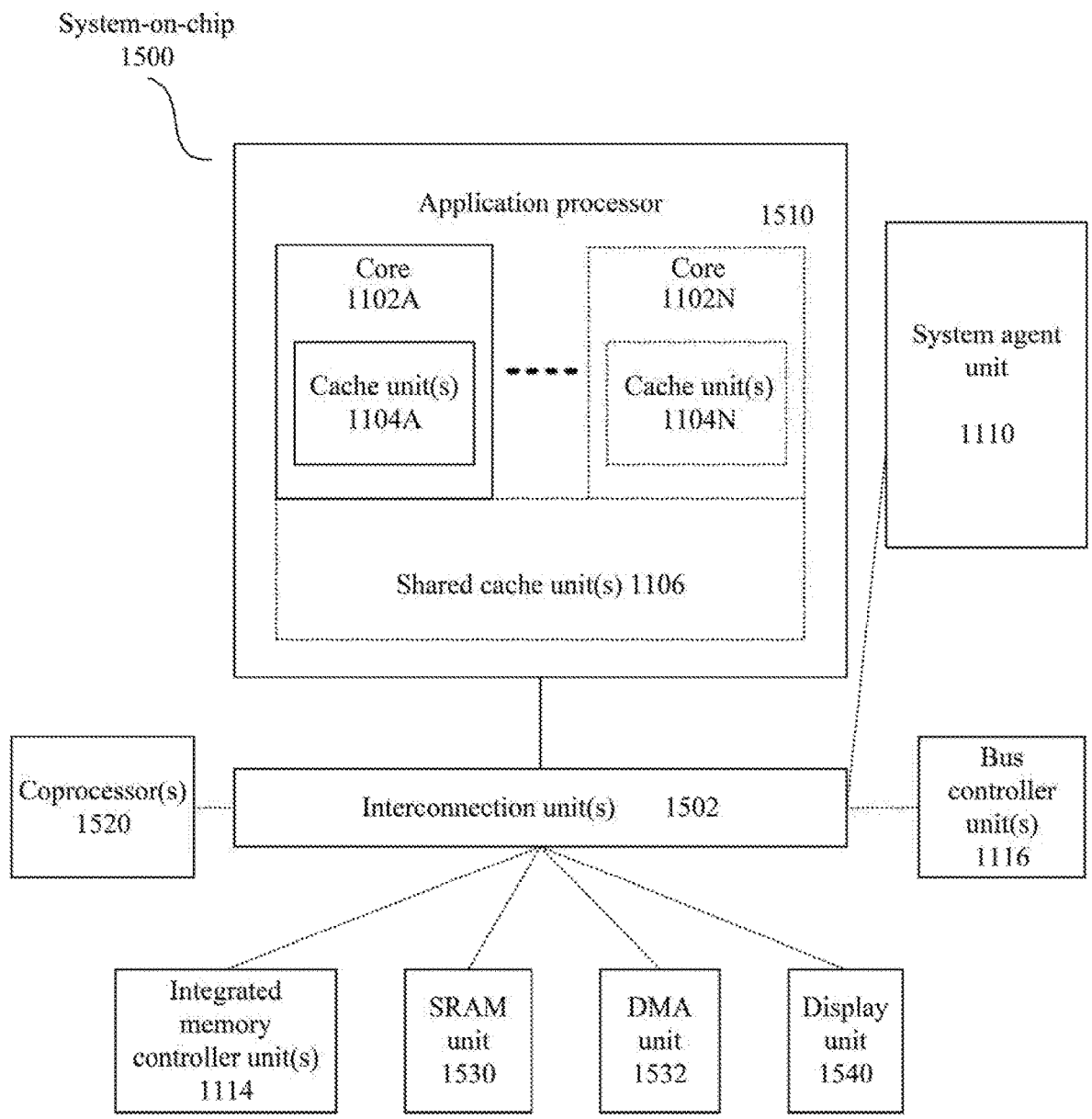
FIG. 9 illustrates a schematic diagram of a system-on-chip (SoC) according to one embodiment of the present invention.

FIG. 9 illustrates a schematic diagram of a system-on-chip (SoC) 1500 according to one embodiment of the present invention. The system-on-chip shown in FIG. 9 includes the processor 1100 shown in FIG. 7, and components similar to those in FIG. 7 are denoted by the same reference numerals. As illustrated in FIG. 9, an interconnection unit 1502 is coupled to an application processor 1510, a system agent unit 1110, a bus controller unit 1116, an integrated memory controller unit 1114, one or more coprocessors 1520, a Static Random Access Memory (SRAM) unit 1530, a Direct Memory Access (DMA) unit 1532, and a display unit 1540 for being coupled to one or more external displays. The application processor 1510 includes a set of one or more cores 1102A to 1102N, and a shared cache unit 1106. The coprocessor 1520 includes an integrated graphics logic, an image processor, an audio processor, and a video processor. In one embodiment, the coprocessor 1520 includes a dedicated processor, for example, a network or communication processor, a compression engine, a GPGPU, a high-throughput MIC processor, or an embedded processor.

All the embodiments of the mechanisms disclosed herein may be implemented in hardware, software, firmware, or a combination thereof. The embodiments of the present invention may be implemented as computer programs or program code executed on a programmable system. The programmable system includes at least one processor, a storage system (including volatile and non-volatile memories and/or storage elements), at least one input device, and at least one output device.

The system-on chip described above may be included in an intelligent device to implement corresponding functions in the intelligent device, including but not limited to executing related control programs, data analysis, computing and processing, network communication, controlling peripherals of the intelligent device, and so on.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the home and entertainment field, for example, may be implemented as a smart speaker, a smart air conditioner, a smart refrigerator, a smart display device, or the like. These devices include the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include, the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing data processing by using the system-on-chip of the present invention fall within the protection scope of the present invention.

It should be understood that, for the purpose of streamlining the present disclosure and aiding in the understanding of one or more of the inventive aspects, in the foregoing description of the exemplary embodiments of the present invention, various features of the present invention are sometimes grouped together into a single embodiment, diagram, or description thereof. However, the disclosed method is not to be interpreted as reflecting an intention that the claimed invention requires more features than those expressly recited in each claim. Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination.

In addition, some of the embodiments are described herein as a combination of methods or method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have a given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in the specification is mainly selected for readability and teaching purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is descriptive rather than restrictive, and the scope of the present invention should be defined by the appended claims.

What is claimed is:

1. An instruction processing apparatus, comprising:
a first register adapted to store address information;
a second register adapted to store address space identification information;
a decoder adapted to receive and decode a translation lookaside buffer flush instruction, wherein the translation lookaside buffer flush instruction indicates that:
the first register serves as a first operand including address information, and
the second register serves as a second operand including address space identification information and a physical page identifier of a root page table;
a hardware register coupled to the execution unit and adapted to store:
a virtualization identifier indicating whether a hypervisor mode is enabled; and
a permission identifier indicating a running permission mode;
when the virtualization identifier indicates that the hypervisor mode is not enabled;
the address information stored in the first register is virtual address information
the physical page identifier stored in the second register is a physical page identifier of a root page table of first-level address translation for translating a virtual address into a physical address
an execution unit coupled to the first register, the second register, and the decoder and adapted to execute the decoded translation lookaside buffer flush instruction, so as to acquire the address information from the first register, to acquire the address space identification information and the physical page identifier of the root page table from the second register, and to broadcast the acquired address information, address space identification information and physical page identifier of the root page table on a bus coupled to the instruction processing apparatus, so that another processing unit coupled to the bus performs flush on a translation lookaside buffer corresponding to the address information in the root page table, in an address space indicated by the address space identification information.

2. The instruction processing apparatus according to claim 1, wherein when the virtualization identifier indicates that the hypervisor mode is enabled, and the permission identifier indicates that a current flush instruction is executed in a guest machine:

the address information stored in the first register is guest-machine virtual address information;

the physical page identifier stored in the second register is a physical page identifier of the root page table of first-level address translation for translating a guest-machine virtual address into a guest-machine physical address; and the execution unit is adapted to:

acquire, from the hardware register, a virtual machine identifier and a physical page identifier of a root page table of second-level address translation for translating a guest-machine physical address into a physical address; and send the guest-machine virtual address, the physical page identifier of the root page table of first-level address translation, the address space identification information, the virtual machine identifier, and the physical page identifier of the root page table of second-level address translation together to the bus.

3. The instruction processing apparatus according to claim 1, wherein the second register further stores a mode identifier; and when the virtualization identifier indicates that the hypervisor mode is enabled, the permission identifier indicates that the translation lookaside buffer flush instruction is executed in a host machine, and the mode identifier indicates a first mode:

the address information stored in the first register is virtual address information;

the physical page identifier stored in the second register is a physical page identifier of the root page table of first-level address translation for translating a virtual address into a physical address; and the execution unit is adapted to send the virtual address information, the physical page identifier of the root page table of first-level address translation, and the address space identification information together to the bus.

4. The instruction processing apparatus according to claim 3, wherein when the virtualization identifier indicates that the hypervisor mode is enabled, the permission identifier indicates that the translation lookaside buffer flush instruction is executed in the host machine, and the mode identifier indicates a second mode:

the address information stored in the first register is guest-machine physical address information;

the physical page identifier stored in the second register is a physical page identifier of the root page table of the second-level address translation for translating a guest-machine physical address into a physical address;

the address space identification information stored in the second register is a virtual machine identifier; and the execution unit is adapted to send the guest-machine physical address, the physical page identifier of the root page table of the second-level address translation, and the virtual machine identifier together to the bus.

5. The instruction processing apparatus according to claim 1, wherein the hardware register stores an enabling identifier indicating whether execution of the translation lookaside buffer flush instruction is allowed; and the execution unit is adapted to skip executing the decoded translation lookaside buffer flush instruction when the enabling identifier indicates that execution of the translation lookaside buffer flush instruction is not allowed.

6. The instruction processing apparatus according to claim 1, wherein a first part of the second register stores a physical page identifier, a second part different from the first part stores the address space identification information, and a third part different from the first and second parts stores a mode identifier.

7. An IO storage management unit coupled to a bus, comprising:

a group mapping table in which an association relationship between a domain identifier and a physical page identifier of a root page table is stored; and the IO storage management unit is adapted to: when receiving, via the bus, a broadcast sent by the instruction processing apparatus according to claim 1, fetch the physical page identifier, look up a domain identifier corresponding to the physical page identifier in the group mapping table, and use the domain identifier and received address information to flush an entry from a corresponding translation lookaside buffer.

8. A system-on-chip, comprising the instruction processing apparatus according to claim 1.

9. An intelligent device, comprising the system-on-chip according to claim 8.

10. An instruction processing method, comprising:

receiving and decoding a translation lookaside buffer flush instruction, wherein the translation lookaside buffer flush instruction indicates that a first register is a first operand and a second register is a second operand;

acquiring, from a hardware register, a virtualization identifier indicating whether a hypervisor mode is enabled and a permission identifier indicating a running permission mode and executing the decoded translation lookaside buffer flush instruction, so as to acquire address information from the first register, to acquire address space identification information and a physical page identifier of a root page from the second register, and to broadcast the acquired address information, address space identification information and physical page identifier of the root page on a bus, so that another processing unit coupled to the bus performs purging on a translation lookaside buffer, corresponding to the address information in the root page table, in an address space indicated by the address space identification information, wherein when the virtualization identifier indicates that the hypervisor mode is not enabled:

the address information stored in the first register is virtual address information;

the physical page identifier stored in the second register is a physical page identifier of a root page table of first-level address translation for translating a virtual address into a physical address; and the executing the flush instruction comprises sending the virtual address information, the physical page identifier of the root page table of first-level address translation, and the address space identifier together to the bus.

11. The instruction processing method according to claim 10, wherein when the virtualization identifier indicates that the hypervisor mode is enabled, and the permission identifier indicates that a current flush instruction is executed in a guest machine:

the address information stored in the first register is guest-machine virtual address information;

the physical page identifier stored in the second register is a physical page identifier of the root page table of first-level address translation for translating a guest-machine virtual address into a guest-machine physical address; and the executing the flush instruction comprises:
acquiring, from the hardware register, a virtual machine identifier and a physical page identifier of a root page table of second-level address translation for translating a guest-machine physical address into a physical address; and sending the guest-machine virtual address, the physical page identifier of the root page table of first-level address translation, the address space identifier, the virtual machine identifier, and the physical page identifier of the root page table of second-level address translation together to the bus.

12. An IO storage management method, comprising:
receiving, via a bus, a message broadcast sent by using the instruction processing method according to claim 10;
fetching a physical page identifier of a root page table from the broadcast message, and looking up a domain identifier corresponding to the physical page identifier in a group mapping table, wherein the group mapping table stores an association relationship between a domain identifier and a physical page identifier of the root page table; and
using the looked up domain identifier and address information that is fetched from the broadcast message to flush an entry from a corresponding translation lookaside buffer.

13. A non-transitory machine-readable storage medium, wherein the machine-readable storage medium comprises code, and when being executed, the code enables a machine to execute the method according to claim 10.

14. The instruction processing method according to claim 10, wherein the second register further stores a mode identifier; and when the virtualization identifier indicates that the hypervisor mode is enabled, the permission identifier indicates that the translation lookaside buffer flush instruction is executed in a host machine, and the mode identifier indicates a first mode:
the address information stored in the first register is virtual address information;
the physical page identifier stored in the second register is a physical page identifier of the root page table of first-level address translation for translating a virtual address into a physical address; and
the execution unit is adapted to send the virtual address information, the physical page identifier of the root page table of first-level address translation, and the address space identification information together to the bus.

15. The instruction processing method according to claim 14, wherein when the virtualization identifier indicates that the hypervisor mode is enabled, the permission identifier indicates that the translation lookaside buffer flush instruction is executed in the host machine, and the mode identifier indicates a second mode:
the address information stored in the first register is guest-machine physical address information;
the physical page identifier stored in the second register is a physical page identifier of the root page table of the second-level address translation for translating a guest-machine physical address into a physical address;
the address space identification information stored in the second register is a virtual machine identifier; and
the execution unit is adapted to send the guest-machine physical address, the physical page identifier of the root page table of the second-level address translation, and the virtual machine identifier together to the bus.

16. A computing system, comprising:
a memory, and
a processor, coupled to the memory and comprising:
a register set, comprising a first register adapted to store address information and a second register adapted to store address space identification information and a physical page identifier of a root page table;
a decoder adapted to receive and decode a translation lookaside buffer flush instruction and a virtualization identifier, wherein the translation lookaside buffer flush instruction indicates that the first register is a first operand and the second register is a second operand; and
an execution unit coupled to the first register, the second register, and the decoder and executing the decoded translation lookaside buffer flush instruction, so as to acquire address information from the first register, to acquire the physical page identifier and address space identification information from the second register, and to broadcast the acquired address information, physical page identifier, and address space identification information on a bus coupled to the processor, so that another processing unit coupled to the bus performs purging on a translation lookaside buffer, corresponding to the address information, in an address space indicated by the address space identification information and/or the physical page identifier, wherein when the virtualization identifier indicates that the hypervisor mode is not enabled:
the address information stored in the first register is virtual address information;
the physical page identifier stored in the second register is a physical page identifier of a root page table of first-level address translation for translating a virtual address into a physical address; and
the execution unit is adapted to send the virtual address information, the physical page identifier of the root page table of first-level address translation, and the address space identification information together to the bus.

17. The computing system of claim 16, wherein when the virtualization identifier indicates that the hypervisor mode is enabled, and the permission identifier indicates that a current flush instruction is executed in a guest machine:
the address information stored in the first register is guest-machine virtual address information;
the physical page identifier stored in the second register is a physical page identifier of the root page table of first-level address translation for translating a guest-machine virtual address into a guest-machine physical address; and
the execution unit is adapted to:
acquire, from the hardware register, a virtual machine identifier and a physical page identifier of a root page table of second-level address translation for translating a guest-machine physical address into a physical address; and
send the guest-machine virtual address, the physical page identifier of the root page table of first-level address translation, the address space identification information, the virtual machine identifier, and the physical page identifier of the root page table of second-level address translation together to the bus.

18. The computing system of claim 16, wherein the second register further stores a mode identifier; and when the virtualization identifier indicates that the hypervisor mode is enabled, the permission identifier indicates that the translation lookaside buffer flush instruction is executed in a host machine, and the mode identifier indicates a first mode:

the address information stored in the first register is virtual address information;

the physical page identifier stored in the second register is a physical page identifier of the root page table of first-level address translation for translating a virtual address into a physical address; and the execution unit is adapted to send the virtual address information, the physical page identifier of the root page table of first-level address translation, and the address space identification information together to the bus.

19. The computing system of claim 18, wherein when the virtualization identifier indicates that the hypervisor mode is enabled, the permission identifier indicates that the translation lookaside buffer flush instruction is executed in the host machine, and the mode identifier indicates a second mode:

the address information stored in the first register is guest-machine physical address information;

the physical page identifier stored in the second register is a physical page identifier of the root page table of the second-level address translation for translating a guest-machine physical address into a physical address;

the address space identification information stored in the second register is a virtual machine identifier; and the execution unit is adapted to send the guest-machine physical address, the physical page identifier of the root page table of the second-level address translation, and the virtual machine identifier together to the bus.

* * * * *